(12) United States Patent
Morenko et al.

(10) Patent No.: US 7,703,286 B2
(45) Date of Patent: Apr. 27, 2010

(54) INTERNAL FUEL MANIFOLD AND FUEL FAIRING INTERFACE

(75) Inventors: Oleg Morenko, Oakville (CA); Bryan Olver, Nobleton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 281 days.

(21) Appl. No.: 11/534,246

(22) Filed: Sep. 22, 2006

(65) Prior Publication Data

US 2008/0072601 A1 Mar. 27, 2008

(51) Int. Cl.
*F02C 1/00* (2006.01)

(52) U.S. Cl. .............................. 60/734; 60/739; 60/742

(58) Field of Classification Search .................... 60/734, 60/739, 742, 772; 239/450, 416.1, 416.2, 239/416.3
See application file for complete search history.

(56) References Cited

U.S. PATENT DOCUMENTS

| | | | |
|---|---|---|---|
| 1,081,950 A | 12/1913 | Eller | |
| 2,443,373 A | 6/1948 | Borsoff | |
| 4,332,626 A | 6/1982 | Hood et al. | |
| 4,377,420 A | 3/1983 | Granatek et al. | |
| 4,472,133 A | 9/1984 | Petersen et al. | |
| 4,703,888 A | 11/1987 | Kawamura et al. | |
| 5,771,696 A | 6/1998 | Hansel et al. | |
| 5,797,266 A | 8/1998 | Brocard et al. | |
| 5,938,402 A | 8/1999 | Bochud et al. | |
| 5,944,483 A | 8/1999 | Beck et al. | |
| 6,503,334 B2 | 1/2003 | Ruiz et al. | |
| 6,712,080 B1 | 3/2004 | Handschuh et al. | |
| 2004/0040306 A1* | 3/2004 | Prociw et al. | 60/740 |
| 2005/0160738 A1* | 7/2005 | Fish et al. | 60/776 |
| 2007/0006589 A1* | 1/2007 | Muldoon et al. | 60/761 |
| 2008/0016869 A1* | 1/2008 | Fish et al. | 60/739 |

* cited by examiner

*Primary Examiner*—Michael Cuff
*Assistant Examiner*—Phutthiwat Wongwian
(74) *Attorney, Agent, or Firm*—Ogilvy Renault LLP

(57) ABSTRACT

A mounting system for an annular internal fuel manifold disposed within a gas turbine engine includes a fuel inlet assembly having a heat shield extending about at least a portion of an inner fuel inlet tube. The heat shield has a distal end engaged with the fuel manifold and has a radially outwardly projecting shoulder proximate an opposed proximal end thereof. The proximal end of the heat shield is received within a bushing disposed within a corresponding opening of a supporting casing. The shoulder of the heat shield retains the bushing in place.

8 Claims, 3 Drawing Sheets

US 7,703,286 B2

INTERNAL FUEL MANIFOLD AND FUEL FAIRING INTERFACE

TECHNICAL FIELD

The technical field relates generally to internal fuel manifolds for gas turbine engines, and more specifically to a mounting configuration for an internal fuel manifold in a gas turbine engine.

BACKGROUND OF THE ART

Gas turbine engine internal fuel manifolds are typically located inside the engine case adjacent the engine combustor, and thus reside in an extremely hot environment. As is typical with other hardware mounted inside a gas turbine engine, complex connections are required to allow for thermal expansion and accommodate mismatches in thermal expansion which may exist between components made of different materials. Complex systems are more difficult to make and assemble, and tend to add weight and cost. Therefore, there is a continuing need to provide improvements to gas turbine internal manifold mounting systems.

SUMMARY OF THE INVENTION

It is an object of the present invention to provide an improved mounting configuration for an internal fuel manifold of a gas turbine engine.

There is therefore provided, in accordance with one aspect of the present invention, a mounting system for an internal fuel manifold of a gas turbine engine comprising a series of supports spaced apart about the annular fuel manifold, the fuel manifold having at least one fuel conveying passage therein in fluid flow communication with a plurality of fuel injection nozzles disposed along the fuel manifold and adapted to spray fuel into the combustor, the series of supports including a fuel inlet assembly connected to the fuel manifold and providing fuel flow to the fuel conveying passage, the fuel inlet assembly having a heat shield surrounding an internal fuel inlet tube defining a fuel flow passage therein, the heat shield extending between a distal end engaged with the fuel manifold and a proximal end matingly received within an opening in a supporting fuel fairing, an annular bushing being disposed within said opening between said fuel fairing and said proximal end of the heat shield, the heat shield having a shoulder proximate said proximal end, said shoulder retaining the bushing in place within said opening of the fuel fairing.

There is also provided, in accordance with another aspect of the present invention, a mounting system for an annular internal fuel manifold disposed within a gas generator casing of a gas turbine engine, the mounting system comprising at least a fuel inlet assembly having a fuel inlet tube defining therein at least one fuel flow passage in fluid flow communication with at least one fuel conveying passage within the fuel manifold, the fuel inlet assembly including a heat shield extending about at least a portion of the fuel inlet tube, the heat shield having a distal end thereof engaged with the fuel manifold and having a radially outwardly projecting shoulder proximate an opposed proximal end thereof, the proximal end being received within a bushing disposed within a corresponding opening of a supporting casing, said shoulder of the heat shield retaining the bushing in place within said opening of the supporting casing.

There is further provided, in accordance with another aspect of the present invention, an internal fuel manifold assembly for a gas turbine engine comprising: a fuel manifold ring having at least one fuel conveying passage therein in fluid flow communication with a plurality of fuel injection nozzles adapted for spraying fuel into a combustor of the gas turbine engine; a mounting system for supporting and positioning the fuel manifold ring within the gas turbine engine, the mounting system including at least a fuel inlet assembly having a fuel inlet tube defining therein at least one fuel flow passage in fluid flow communication with said at least one fuel conveying passage within the fuel manifold ring, the fuel inlet assembly including a heat shield disposed outwardly from the fuel inlet tube and extending along at least a portion of a length of the fuel inlet tube, the heat shield having a distal end thereof engaged with the fuel manifold ring and having an opposed proximal end matingly received within a bushing mounted within an corresponding opening; and wherein the heat shield includes a radially outwardly projecting shoulder near said proximal end thereof, said shoulder of the heat shield abutting the bushing such as to limit relative displacement therebetween.

There is further provided, in accordance with another aspect of the present invention, a heat shield for a fuel inlet assembly of an internal fuel manifold in a gas turbine engine, the heat shield comprising: a tubular central body portion sized such that a fuel inlet tube in receivable therein and extending between a proximal end and a distal end thereof, the distal engage being adapted for engagement with the internal fuel manifold, the proximal end having a first diameter adapted for receipt within a mating bushing of a supporting casing; and a shoulder radially extending outwardly from at least said proximal end proximate thereto, said shoulder having a second diameter greater than said first diameter.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
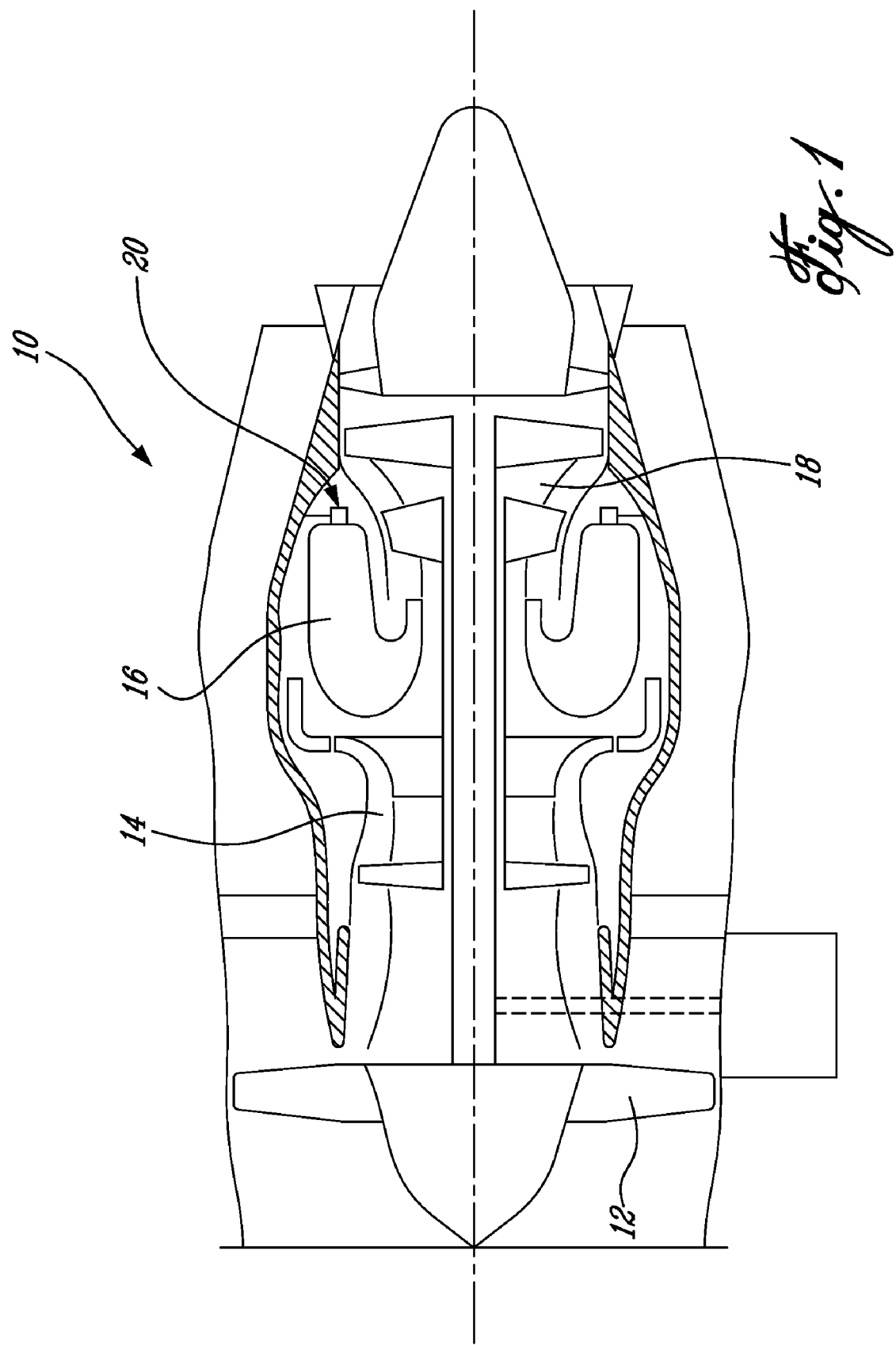
FIG. 1 is schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
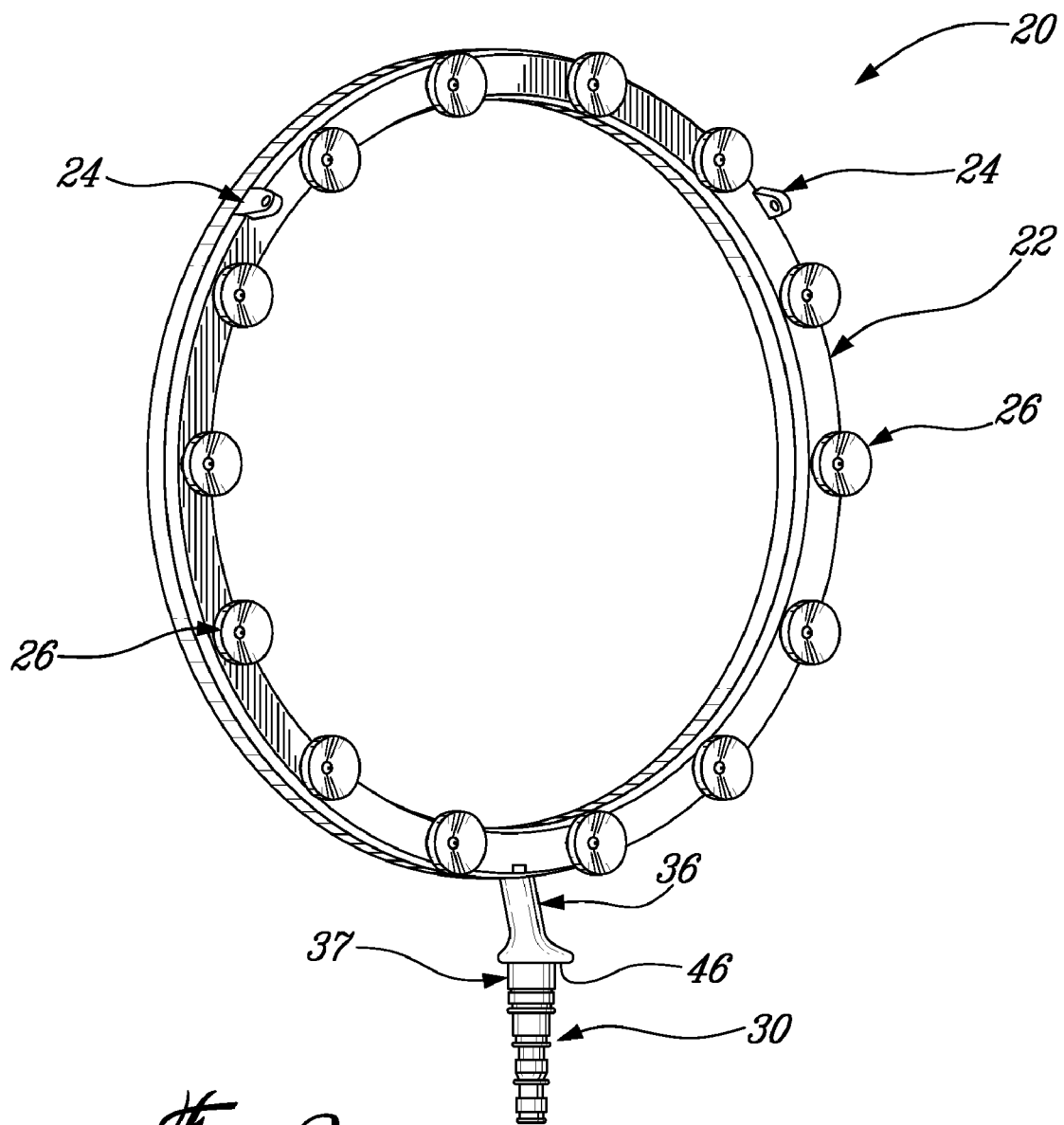
FIG. 2 is a perspective view of an internal fuel manifold incorporating a fuel inlet having a mounting configuration in accordance with the present invention, for use in a gas turbine engine such as that depicted in FIG. 1.

Referring to FIG. 2, the fuel injection system 20 includes at least one fuel conveying member through which fuel flows. In the exemplary embodiment, the fuel injection system includes an annular fuel manifold ring 22 which is mounted adjacent to the combustor 16 in the gas turbine engine 10. The fuel manifold ring 22 is preferably mounted within the engine 10 by a mounting system which includes at least partially the fuel inlet assembly 30, as will be discussed further below. A pair of integral attachment lugs 24 which receive pins (not shown) may also comprise part of the mounting system for engaging the fuel manifold 22 of the fuel injection system within the engine. This provides a mounting system/mechanism which allows for secure attachment of the manifold within the supporting casing, as will also be discussed further below. A plurality of fuel injecting nozzle assemblies 26 are provided about the circumference of the fuel manifold ring 22. The fuel nozzle assemblies 26 atomize the fuel as it is injected into the combustor for ignition when mixed with the compressed air therein. Fuel enters the annular fuel manifold ring 22 via a fuel inlet assembly 30, and is distributed within the manifold ring 22 such that fuel flow is provided to each of the fuel nozzles assemblies 26. As will be described in further detail below, the fuel inlet 30 includes an outer fuel inlet heat shield 36 having an enlarged proximal end 37 defining a shoulder 46 therein which is adapted to abut against a bushing within a mating boss of the casing within which the fuel inlet 30 is received.

Figure 3:
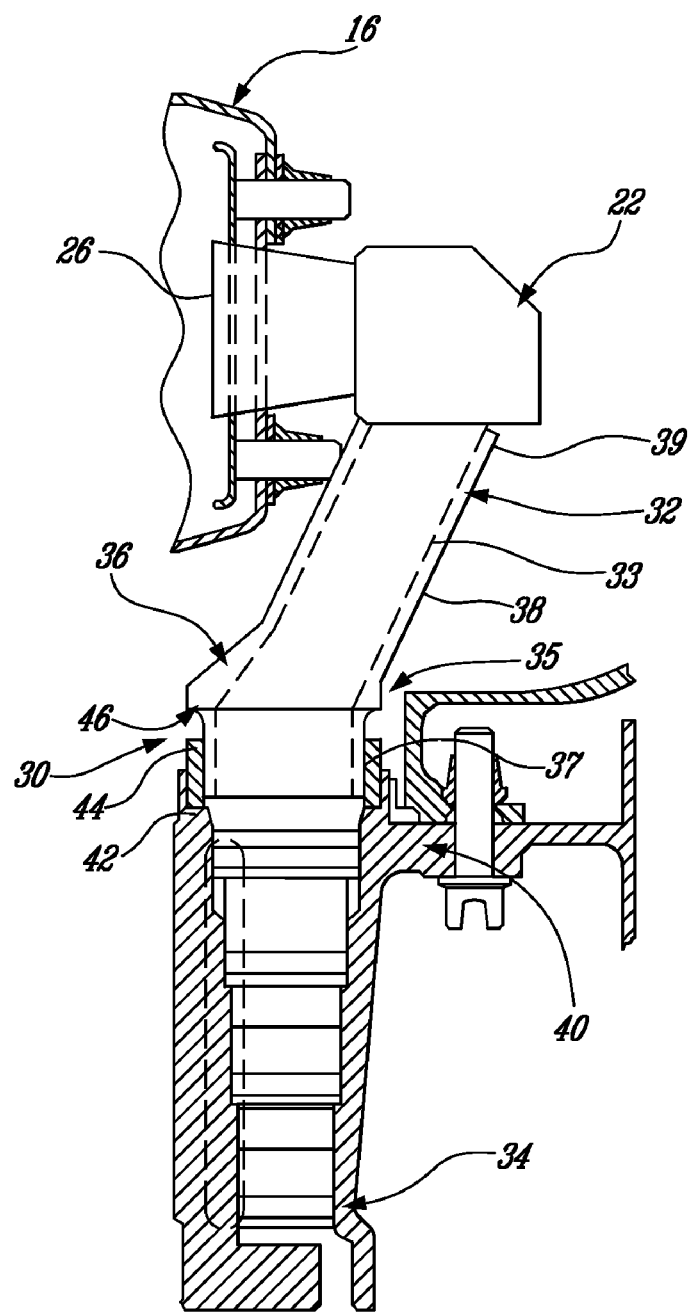
FIG. 3 is a cross-sectional view of the fuel inlet of the fuel manifold of FIG. 2.

Referring to FIG. 3, the fuel inlet assembly 30 includes a fuel inlet tube 33 having a distal end 32 and a proximal end 34. The distal end 32 is connected to a fuel manifold 22 which is located by the fuel inlet tube 33 such that it is mounted adjacent the combustor 16 and delivers fuel to the fuel nozzles 26, the spray tips of which project into the combustor 16. The fuel inlet tube 33 includes at least one fuel flow channel (not shown) therein which is in fluid flow communication with the fuel conduit(s) of the fuel manifold 22. The fuel inlet tube 33 may have a design of the type described in applicant's pending U.S. patent application Ser. No. 10/764,578, published Jul. 28, 2005, the contents of which is incorporated herein by reference, with additional changes to at least the heat shield therearound, as described further below.

The fuel inlet tube 33 can include a bend 35 as depicted, in order to compensate for an offset between the fuel manifold 22 and the fuel source without compromising a fuel flow in the internal channels of the fuel inlet tube. Such a bend eliminates the need for a multi-piece assembly and thus reduces the need for additional welding or brazing during assembly.

At least the distal end 32 of the fuel inlet tube 33 is covered by a heat shield 36. The heat shield 36 extends about the fuel inlet tube 33 along at least a portion of the length thereof, and preferably along the portion of the fuel inlet tube 33 disposed between the fuel manifold 22 and the casing 40 supporting the fuel inlet assembly 30. The heat shield 36 thus helps protect the fuel inlet tube 33 of the fuel inlet assembly 30 against heat damage. The fuel inlet heat shield 36 is configured, in at least one embodiment, to be able to load bearing, and as such it is used to at least partially support the internal fuel manifold 22. Although various overall shapes for the heat shield 36 are possible, the heat shield 36 is preferably generally tubular in shape, having a tubular central body portion 38 extending between a proximal end 37 and a distal end 39. The enlarged proximal end 37 of the fuel inlet heat shield 36 engages the mating boss 42 of the casing 40, in a manner as described below. The opposed distal end 39 of the heat shield 36, which may merely be an extension of the central tubular body 38 or may have a slightly smaller diameter such as to mate with a corresponding bore within the fuel manifold 22. While the engagement between either end of the heat shield 36 and the respective body with which it is mated (i.e. either the fuel manifold 22 or the supporting casing 40) need not necessarily be a sealed engagement, a seal therebetween may also be provided if desired, for example such as to improve the insulating properties of the heat shield 36 around the fuel inlet tube 33. Preferably, an air gap is defined therebetween and further acts as insulation to keep the fuel flowing through the fuel inlet tube 33 cooler.

Referring now in greater detail to the interface or connection between the proximal end 37 of the fuel inlet heat shield 36 and the mating boss 42 of the supporting casing 40 as shown in FIG. 3, a bushing 44 is located within the boss 42 of the casing or fuel fairing 40 within which a portion of the proximal end 37 of the heat shield 36 is matingly received. The bushing 44 may be simply press-fit within a correspondingly sized opening formed in the boss 42 of the fuel fairing 40, or may be otherwise fixed in place therewithin. However, in some prior art designs, similar bushings between the heat shield and the associated casing have been know to work their way loose, such as by tolerance combinations and engine vibration for example, and slide radially upwards along the axis of the fuel inlet tube. In the heat shield 36 of the present invention, the proximal end 37 includes a shoulder 46 which projects radially outwardly therefrom slightly above the most proximal end thereof. The shoulder 46 has a diameter which is greater than that of the most proximal end 37 of the heat shield and which therefore protrudes overtop of the bushing 44 disposed annularly between the most proximal end 37 of the heat shield and the corresponding hole within the boss 44 of the fuel fairing/casing 40. The diameter of the shoulder 46 is therefore also greater than at least the inner diameter of the bushing 44. As such, the bushing 44 is radially trapped, in that it cannot travel radially up the fuel inlet as the overhanging shoulder 46 of the heat shield 36 limits outward movement thereof. Although the shoulder 46 of the heat shield 36 may have any number of particular shapes and configurations, it nonetheless maintains a diameter which is at least slightly larger than that of the more proximal end 37 of the heat shield which is received in a close tolerance mating fit within the mounting bushing 44. This mounting configuration between the heat shield 36 of the fuel inlet assembly 30 and the supporting fuel fairing or casing 40 allows for an improved and safer connection therebetween, as the risk of the bushing disposed within the two components becoming accidentally displaced and/or completely free is eliminated.

The above description is meant to be exemplary only, and one skilled in the art will recognize that changes may be made to the embodiments described without department from the scope of the invention disclosed. For example, alternate configurations of manifold support system and the fuel conveying members such as fuel manifolds and fuel nozzles can be used. The fuel inlet heat shield shape and configuration depicted is preferred, but of course not necessary to achieve the function taught herein. Although described with respect to airborne gas turbines, the invention may be applied to any suitable engine in a suitable application. Still other modifications which fall within the scope of the present invention will be apparent to those skilled in the art, in light of a review of this disclosure, and such modifications are intended to fall within the appended claims.

The invention claimed is:

1. A mounting system for an internal fuel manifold of a gas turbine engine comprising a series of supports spaced apart about the internal fuel manifold, the internal fuel manifold being annular and having at least one fuel conveying passage therein in fluid flow communication with a plurality of fuel injection nozzles disposed along the internal fuel manifold and adapted to spray fuel into a combustor, the series of supports including a fuel inlet assembly connected to the internal fuel manifold and providing fuel flow to the fuel conveying passage, the fuel inlet assembly having an internal fuel inlet tube defining a fuel flow passage therein, the internal fuel inlet tube having a first end engaged to the internal fuel manifold and an opposed second end received within an opening in a fuel fairing, a thin-walled tubular heat shield surrounding the internal fuel inlet tube and being spaced apart therefrom throughout a complete length of both, the heat shield having a first diameter at a distal end thereof engaged with the internal fuel manifold, a second diameter at a proximal end thereof matingly received within said opening in the fuel fairing and a third diameter at a flange portion thereof proximate yet spaced away from the second end, the third diameter being greater than the second diameter, an annular bushing being disposed within said opening between said fuel fairing and said proximal end of the heat shield, the annular bushing having an inside diameter greater than the second diameter and smaller than the third diameter, the flange of the heat shield defining a shoulder projecting radially outwardly from said proximal end and retaining the bushing in place on said proximal end of the heat shield and within said opening of the fuel fairing, the bushing being slidingly received over said proximal end of the heat shield and prevented from further distal displacement by said flange.

2. The mounting system as defined in claim 1, wherein said bushing is circumferentially uninterrupted.

3. The mounting system as defined in claim 1, wherein said shoulder having the second diameter greater than the first diameter.

4. The mounting system as defined in claim 3, wherein said second diameter is greater than at least the inside diameter of said bushing.

5. A mounting system for an internal fuel manifold disposed within a gas turbine engine, the internal fuel manifold being annular, the mounting system comprising at least a fuel inlet assembly having a fuel inlet tube defining therein at least one fuel flow passage in fluid flow communication with at least one fuel conveying passage within the internal fuel manifold, the fuel inlet tube having a first end engaged to the internal fuel manifold and an opposed second end received within an opening in a fuel fairing, the fuel inlet assembly including a thin-walled tubular heat shield extending about the fuel inlet tube and being spaced apart therefrom throughout a complete length of both between the internal fuel manifold and the fuel fairing, the heat shield having a first diameter at a distal end thereof engaged with the internal fuel manifold, and having a radially outwardly projecting shoulder spaced apart from an opposed proximal end thereof, the proximal end defining a second diameter from the shoulder to a most proximal end of the heat shield and being received within an inner diameter of a bushing disposed within the fuel fairing, said shoulder of the heat shield having a third diameter greater than the second diameter of the proximal end of the heat shield and the inner diameter of the bushing, the shoulder retaining the bushing in place on said proximal end of the heat shield and within said opening in the fuel fairing fixed to the supporting engine casing.

6. An internal fuel manifold assembly for a gas turbine engine comprising:
 a fuel manifold ring having at least one fuel conveying passage therein in fluid flow communication with a plurality of fuel injection nozzles adapted for spraying fuel into a combustor of the gas turbine engine;
 a mounting system for supporting and positioning the fuel manifold ring within the gas turbine engine, the mounting system including at least a fuel inlet assembly having a fuel inlet tube defining therein at least one fuel flow passage in fluid flow communication with said at least one fuel conveying passage within the fuel manifold ring, the fuel inlet assembly including a thin-walled tubular heat shield disposed outwardly from the fuel inlet tube such as to be spaced apart therefrom throughout a complete length of both extending between the internal fuel manifold at one end and an opening in a fuel fairing, the heat shield having a first diameter at a distal end thereof engaged with the fuel manifold ring and having a second diameter at an opposed proximal end matingly received within said opening in the fuel fairing, the proximal end of the heat shield being received within a bushing mounted within said opening in the fuel fairing, the bushing having an inner diameter greater than said second diameter and being slidingly received over said proximal end of the heat shield; and
 wherein the heat shield includes a radially outwardly projecting shoulder spaced apart from said proximal end thereof, said shoulder having a third diameter greater than the second diameter of the proximal end and the inside diameter of the annular bushing, the shoulder of the heat shield retaining the bushing in place on said proximal end of the heat shield and within said opening in the fuel fairing.

7. The heat shield as defined in claim 6, wherein said bushing is a circumferentially uninterrupted annular bushing.

8. The heat shield as defined in claim 5, wherein said bushing is a circumferentially uninterrupted annular bushing.

* * * * *